United States Patent [19]

Magarian

[11] 4,208,230
[45] Jun. 17, 1980

[54] IMPREGNATING A FIBROUS WEB WITH LIQUID

[75] Inventor: Gerald M. Magarian, Long Beach, Calif.

[73] Assignee: Ameron, Inc., Monterey Park, Calif.

[21] Appl. No.: 963,782

[22] Filed: Nov. 27, 1978

Related U.S. Application Data

[63] Continuation of Ser. No. 818,952, Jul. 25, 1977, abandoned.

[51] Int. Cl.² ............................................. B65H 81/00
[52] U.S. Cl. ........................................ 156/184; 118/56;
  118/122; 118/123; 118/126; 156/390; 156/446;
  156/459; 427/358; 427/369; 427/389.8
[58] Field of Search .................. 427/369, 358, 390 A;
  118/56, 122, 123, 126; 156/184, 390, 446, 459

[56] References Cited

U.S. PATENT DOCUMENTS

| Re. 8,460 | 10/1878 | Hammerschlag | 427/369 |
|---|---|---|---|
| 488,786 | 12/1892 | Bishop | 427/146 |
| 1,336,528 | 4/1920 | Low | 427/369 |
| 1,336,828 | 4/1920 | Low | 102/216 |
| 1,582,491 | 4/1926 | Stevens | 118/126 |
| 2,014,378 | 9/1935 | Gardiner et al. | 118/DIG. 11 |
| 2,105,531 | 1/1938 | Greider et al. | 427/369 |
| 2,466,734 | 4/1949 | Piazze | 118/126 |
| 2,863,787 | 12/1954 | Osborne | 427/175 |
| 3,025,205 | 3/1962 | Young | 156/169 |
| 3,352,706 | 11/1967 | Alkofer | 427/369 |
| 3,492,187 | 1/1970 | Hirtzer | 156/429 |
| 3,499,815 | 3/1970 | Hof | 156/431 |
| 3,519,520 | 7/1970 | Newman, Jr. | 156/431 |
| 3,616,063 | 10/1971 | Bradley | 156/425 |
| 3,853,604 | 12/1974 | Fleissner | 427/324 |
| 4,018,647 | 4/1977 | Wietsma | 162/168 R |

Primary Examiner—Ronald H. Smith
Assistant Examiner—Janyce A. Bell
Attorney, Agent, or Firm—Christie, Parker & Hale

[57] ABSTRACT

A moving, fibrous web is impregnated with a liquid by placing the liquid on the surface of the web, spreading the liquid over the web surface, pressuring a portion of the liquid into the web to partially saturate the web with the liquid and leave residual liquid on the web, and metering the residual liquid into a layer of substantially uniform thickness. This layer is then forced into the web to saturate it with liquid. This method is particularly effective for producing plastic pipe incorporating at least one layer of fibrous material saturated with liquid resin.

Apparatus for practicing this method comprises a first surface transverse to the surface of the web, and a second surface converging with the web in the direction of travel of the web. The first surface performs the spreading step and the second surface performs the pressuring and metering steps. There are a plurality of projections of substantially uniform height on the trailing edge of the second surface to insure that the residual liquid is metered into a layer of substantially uniform thickness.

23 Claims, 7 Drawing Figures

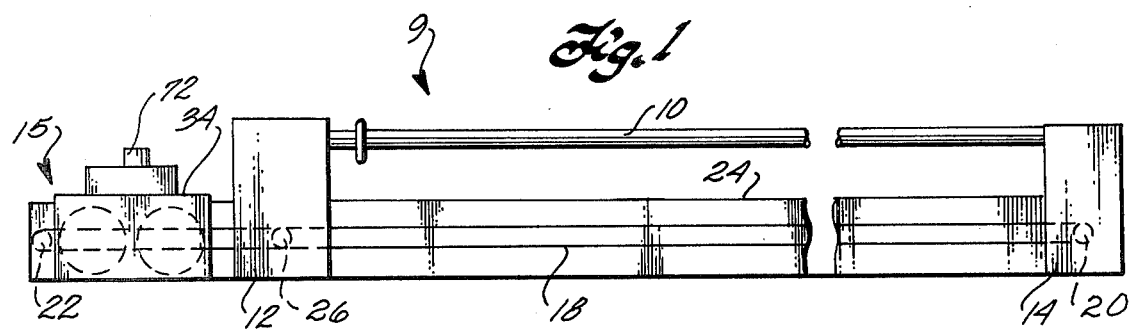
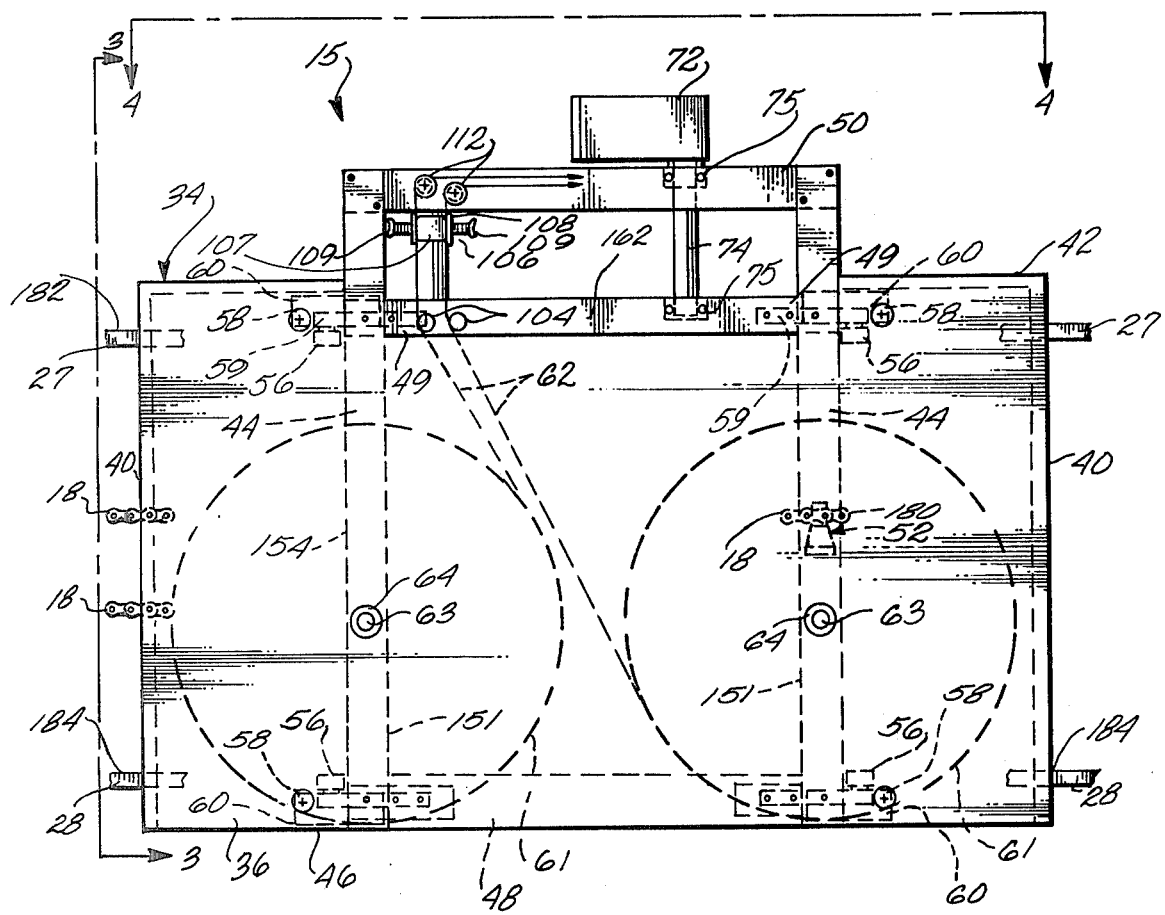

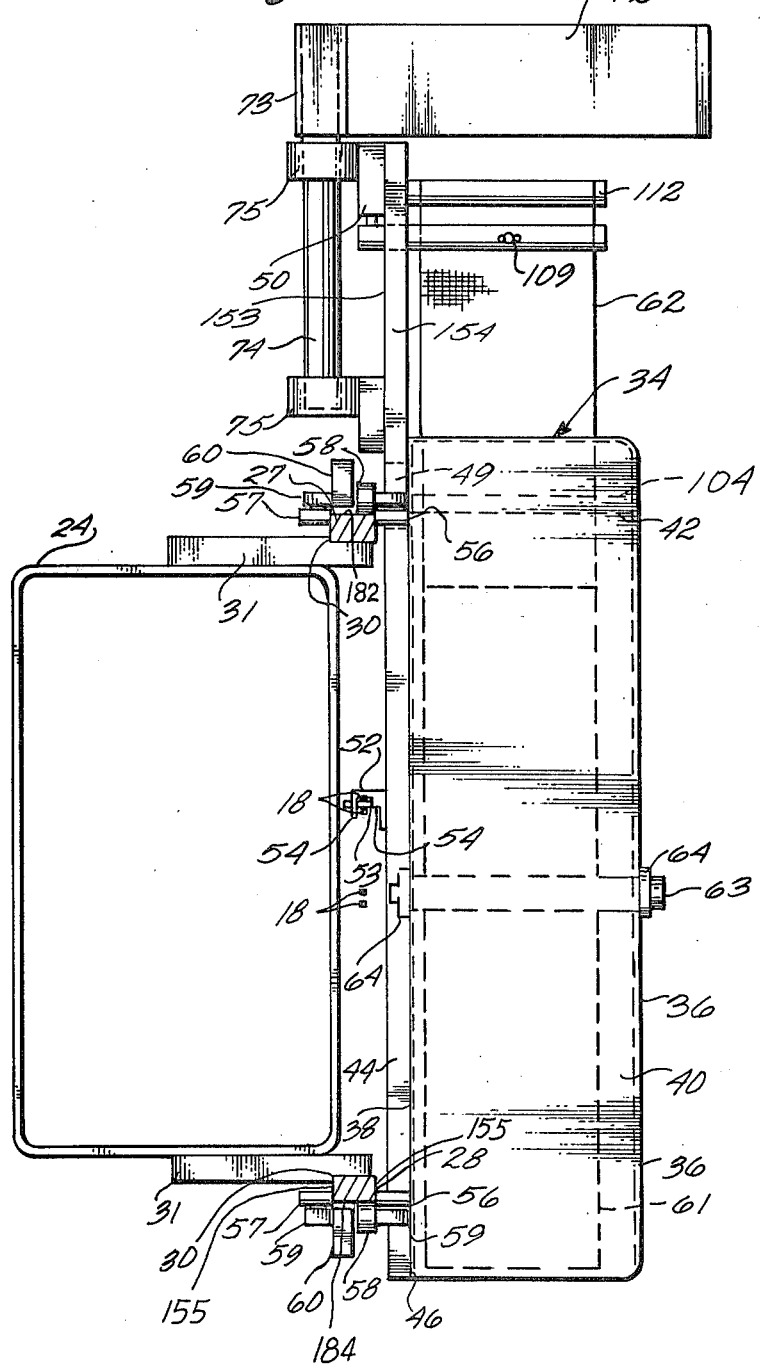

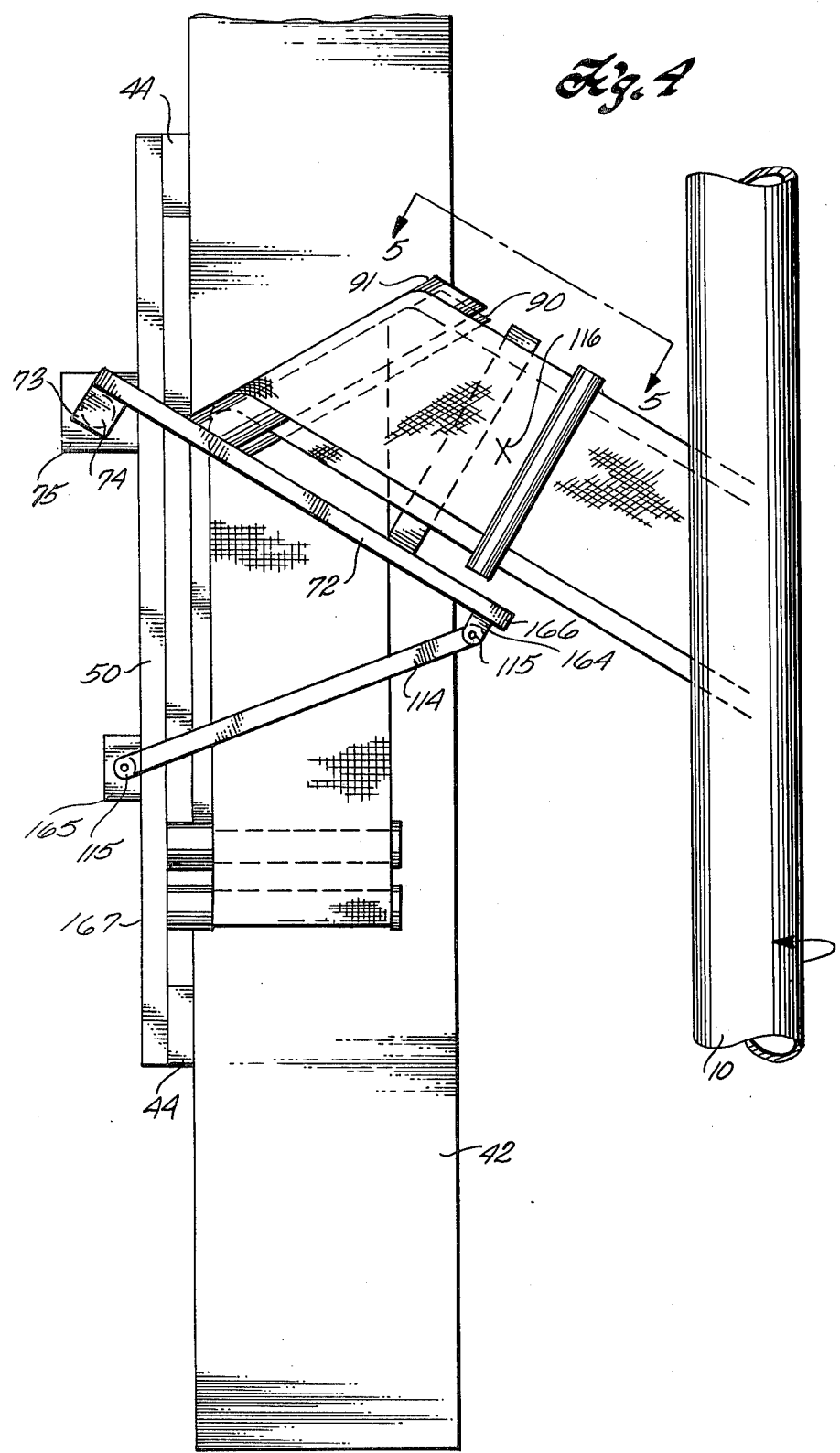

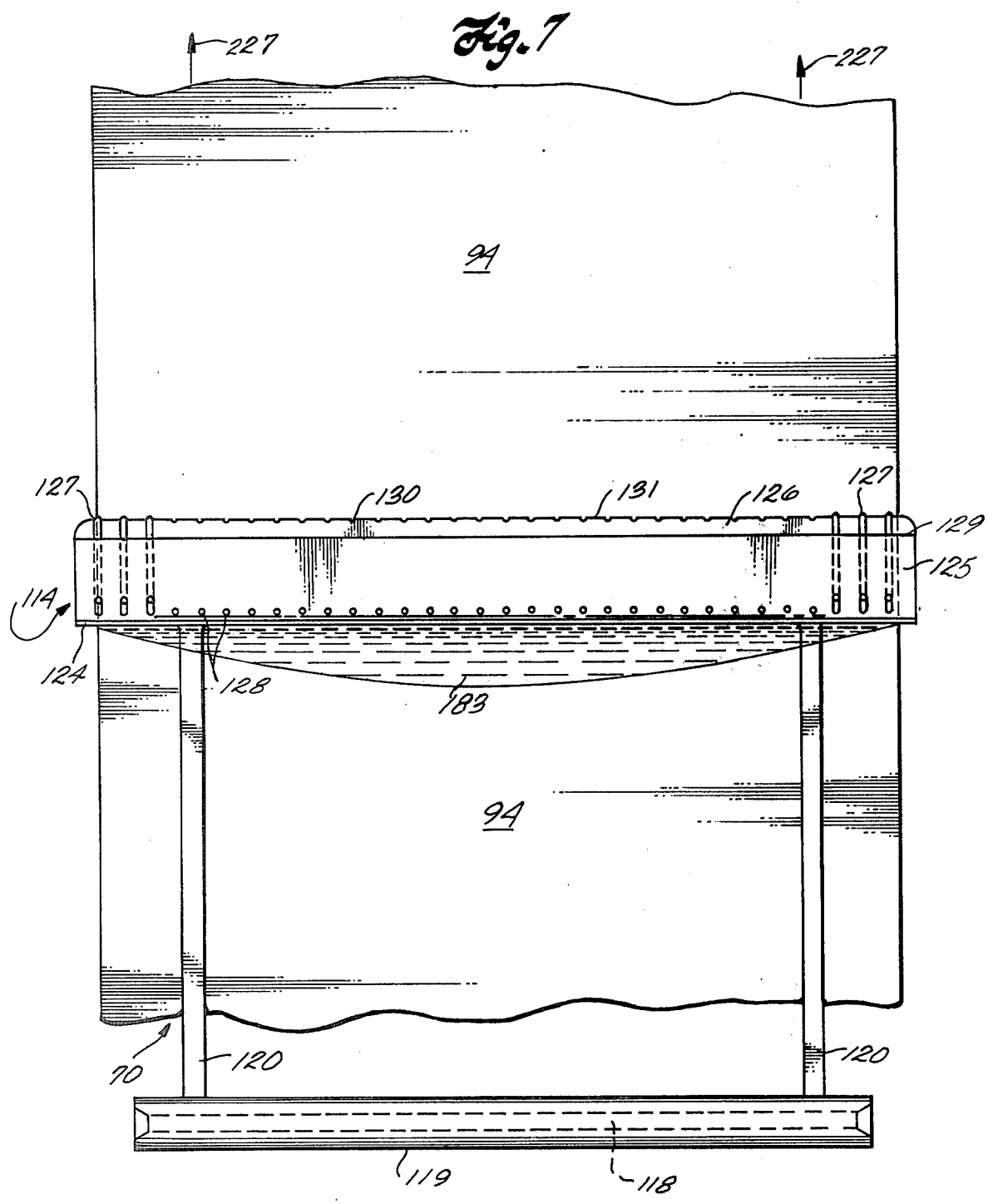

IMPREGNATING A FIBROUS WEB WITH LIQUID

CROSS REFERENCE TO RELATED APPLICATION

This application is a continuation of my copending application, Ser. No. 818,952, filed July 25, 1977, entitled "Impregnating a Fibrous Web with Liquid," now abandoned.

BACKGROUND OF THE INVENTION

This invention relates to methods and apparatuses for impregnating a fibrous web with a liquid.

Many processes involve impregnating an absorbent web with a liquid. Among these is a process for manufacturing plastic pipe that includes a resin impregnated fibrous material as the inner layer to provide corrosion resistance in severe operating conditions. For example, a layer of resin impregnated glass fiber mat is used as the liner for reinforced epoxy pipe in severe chemical service such as transporting caustic solutions at elevated temperatures.

A common problem in making plastic pipe containing a layer of resin impregnated fibrous material is how to saturate the material quickly and completely with the liquid resin. If the fibrous material is not completely saturated with resin, residual air results in voids after curing which can lead to failure from chemical attack of the body of the pipe.

One method used to saturate the fibrous material is to first wind the material around a rotating mandrel, and then squeegee resin into the liner material. However, this method is messy and time consuming since two separate steps are required, namely, a winding step and a resin-impregnating step. In addition, results are too variable since the process is entirely manual.

Another method commonly used to saturate the fibrous material is to soak the material in resin before it is wound around the mandrel. However, this method cannot be used with all types of fibrous materials because in some resin/web combinations the resin dissolves the binder holding the liner material together.

A third method is to pour resin onto the fibrous material immediately in front of the pinch point where the material first contacts the mandrel. The pressure exerted by the mandrel on the fibrous material tends to force the resin into the material. Although this method is useful in some applications, it has disadvantages. For example, when a thick or dense web is used, or the liquid is highly viscous, complete impregnation can be achieved only at slow, uneconomical speeds.

Therefore, there is a need for a high speed, dependable, and economical method and apparatus for saturating a web containing fibrous material with liquid resin.

SUMMARY OF THE INVENTION

I have now invented a method and an apparatus having the above features. The method and apparatus are useful for saturating a moving fibrous web. Typical functions for which this invention is useful include impregnation of at least one layer of fibrous material used for producing reinforced plastic pipe.

In the method of this invention, liquid is spread over the surface of the web, and then a portion of the liquid is pressurized into the web to partially saturate the web. The residual resin left on the web after the pressuring step is leveled or metered into a layer of substantially uniform thickness on the surface of the web. The web is then saturated with the resin by pressing the residual resin into the web. This method saturates the web with resin rapidly, consistently, and dependably.

Liquid resin is spread over the web surface by applying resin onto the web and then contacting the resin with a first surface transverse, and preferably perpendicular, to the surface of the web. The preferred method for pressuring resin into the web is to contact the resin with a second surface converging with the web in the direction of travel of the web.

The resin is metered into a layer of substantially uniform thickness by maintaining the trailing edge of the second surface spaced apart from the surface of the web with a plurality of projections of substantially uniform height on the underside of the trailing edge of the second surface. The height of the projections determines the thickness of the leveled residual resin layer on the web.

The step of pressing the residual resin into the web preferably occurs at the pinch point where the web is wound around a mandrel.

When the method of this invention is used, the web is only partially saturated during the pressuring step. Thus the fibrous material in the web tends to retain its strength because the web is not completely saturated with resin until it is wound about the mandrel, and therefore the fibrous material does not disintegrate during the winding process.

In an apparatus according to this invention, preferably both the first and second surfaces are at least as wide as the web and extend beyond both longitudinal edges of the web so that resin is spread, pressured, and metered over the entire surface of the web. It also is preferred that the projections on the trailing edge of the second surface are continuous, smooth-surfaced and extend substantially parallel to the direction of motion of the web so that they do not damage the web. In a preferred embodiment of the invention the projections consist of a plurality of parallel, uniformly laterally spaced-apart metal wires extending over the second surface to limit the amount of resin spread over the edges of the web.

With the method and apparatus of this invention a web of delicate fibrous material is completely impregnated with resin at high production rates without damage to the web.

These and other features, aspects and advantages of the present invention will become more apparent from the following drawings, detailed description and appended claims.

DRAWINGS

FIG. 1 is a side elevation view of a pipe making machine showing the general relationship of the components of the machine;

FIG. 2 is a side elevation of the liner carriage assembly shown in FIG. 1 without the resin applying elements;

FIG. 3 is a view taken on line 3—3 in FIG. 2 of the liner carriage assembly;

FIG. 4 is a view taken on line 4—4 in FIG. 2 of the liner carriage assembly;

FIG. 7 is a view taken on line 7—7 in FIG. 6.

DETAILED DESCRIPTION OF THE INVENTION

Figure 5:
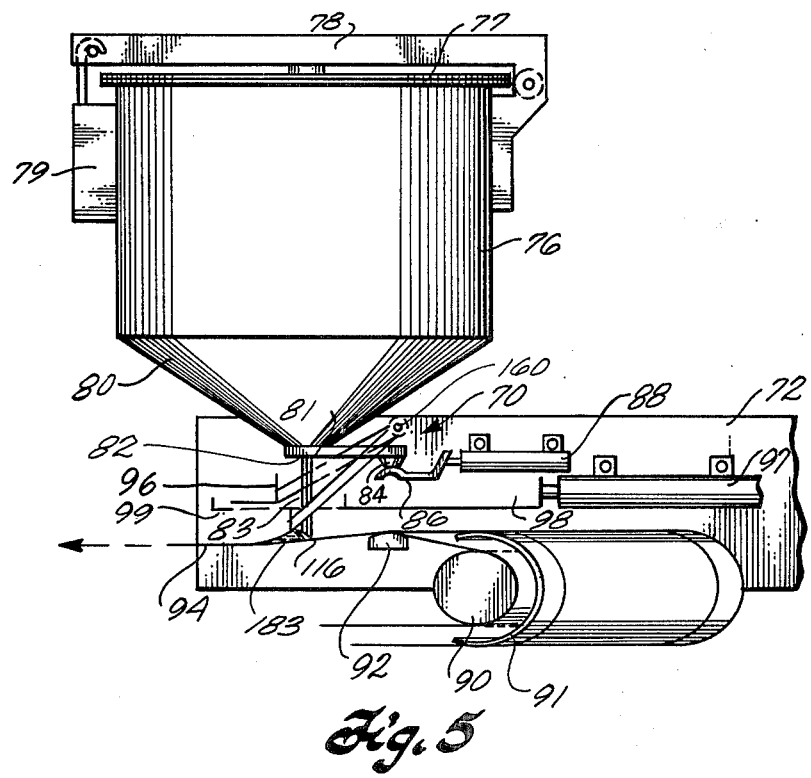
FIG. 5 is a view taken along line 5—5 of FIG. 4 including resin applying elements embodying features of this invention.

Referring to FIG. 1, a pipe making machine 9 includes an elongated, horizontal rotatable mandrel 10 journaled at one end in a headstock assembly 12 and at the opposite end in a tailstock assembly 14. The headstock assembly 12 contains a rotatable drive means (not shown) for rotating the mandrel 10 at a predetermined rate. A liner carriage assembly 15 travels along the mandrel 10 applying a liner consisting of at least one layer of a resin impregnated fibrous material to the mandrel. The liner carriage assembly 15 is pulled longitudinally to and fro along the mandrel 10 by a continuous drive chain 18 which travels over a first end sprocket 20 secured to the tailstock assembly 14 and a second end sprocket 22 secured to a horizontal box beam 24 which extends the length of the pipe making machine. The drive chain 18 is driven by a drive sprocket 26 secured to the headstock assembly 12. The drive sprocket 26 is driven by the same drive means which rotates the mandrel 10, thereby ensuring that the movements of the mandrel 10 and the liner carriage assembly 15 are coordinated.

As shown in FIG. 3, the liner carriage assembly 15 rides on a pair of parallel, horizontal, vertically spaced apart, elongated rails, a top rail 27 and a bottom rail 28 which are cradled in a notch 30 on the surface of a plurality of cleats 31 secured to the top and bottom of the box beam 24.

Referring to FIGS. 2-4, the liner carriage assembly 15 comprises a boxlike cover 34 consisting of five rectangular pieces of sheet metal bolted together, a front sheet 36, a back sheet 38, two end plates 40, and a top sheet 42. The frame of the carriage assembly comprises a pair of parallel, laterally spaced-apart, vertical mounting bars 44 attached to the outside surface of the back sheet and extending from the bottom edge 46 of the back sheet to above the top sheet 42, and three rectangular, parallel, horizontal beams, a bottom beam 48, a middle beam 49, and a top beam 50, mounted on the vertical mounting bars 44 at the bottom of the vertical mounting bars, at the level of the top sheet 42, and at the top of the vertical mounting bars, respectively. The bottom 48 and middle 49 beams are mounted against facing surfaces 151 of the vertical mounting bars 44 with four short, horizontal plates 59 bolted to a vertical mounting bar and a beam where the beams and bars intersect. The top beam 50 is bolted against the back faces 153 of the vertical bars 44.

The plates 59 supporting the bottom 48 and middle 49 beams extend beyond the vertical bars to support rollers. The carriage assembly 15 rides on the rails 27, 28 by means of four groups of rollers, each group consisting of three rollers 56, 57, 58. Two of the rollers 56, 57 of each group engage the sides 155 of the rails 27, 28 and are bolted to the plates 59 at the intersection of the middle beam 49 and each of the vertical mounting bars 44 and at the intersection of the bottom beam 48 and each of the vertical mounting bars 44. The third roller 58 of each group engages the top 182 of the upper rail 27 or the bottom 184 of the lower rail 28 and is mounted above the upper rail 27 or below the lower rail 28 on one of four bars 60, one of which is bolted to the top of each top plate for the top rail and the bottom of each bottom plate for the bottom rail.

The liner carriage assembly 15 engages the drive chain 18 with an "n"-shaped clip 52 mounted on the back surface 153 of one of the vertical mounting bars 44 at a height at about the midpoint of the front plate 36. A pin 52 extends through the arms 54 of the clip and the chain link 180 positioned between the arms.

There are two rolls 61 of fibrous lining material 62, each mounted on a horizontal cylindrical pin 63 attached to the front of the vertical mounting bars 44. Although only two rolls 61 of fibrous material 62 are shown in the drawings, this invention contemplates webs made from any number of layers of fibrous material where the layers can be of the same or of different materials.

Means for applying resin to the fibrous material, means for guiding the fibrous material to the rotating mandrel 10, and a doctor bar assembly 70 are mounted on a vertically oriented hinged support plate 72. The support plate 72 swings like a flag above the horizontal top beam 50 from a block 73 to which it is welded. A vertical pivot shaft 74 is mounted in pivot bearings 75 bolted to the middle 49 and top 50 horizontal beams and extends through the block 73.

With reference to FIG. 5, the resin applying means comprises a cylindrical resin tank 76 having a gasketed airtight lid 77 held in place by a horizontal bar 78 secured with a toggle clamp 79. The bottom 80 of the resin tank 76 is conical. A plate 81 with a small circular port 82 through which resin 83 flows is welded to the bottom of the tank. The resin tank can be pressurized with a gas which is nonreactive with the resin to regulate the flow rate of resin 83. A small sliding member 84 is held against the bottom surface of the plate 81 by a leaf spring 86. A linear actuator, such as an air cylinder, 88 slides member 84 along the plate 81 to close off the resin port 82 when necessary. The cylinder 88 is bolted to the support plate 72. The resin port 82 is shown in an open position in FIG. 5.

The means for guiding the fibrous material into a position where it can be impregnated with liquid resin consists of an elongated horizontal cylindrical lining guide 90, an elongated semicylindrical lining guide 91 which matches the curvature of the lining guide 90 and is laterally spaced therefrom, and a rigid horizontal elongated support bar 92 laterally spaced from the lining guides 90 and 91. Both lining guides 90, 91 and the support bar 92 project from and are bolted onto the support plate 72.

The doctor bar assembly 70, which is described in detail below, is mounted to pivot on a pivot shaft 160 projecting outwardly from the support plate 72. In operation the doctor bar assembly 70 rides on the surface of the horizontally oriented web 94 after resin 83 is placed on the web. However, when the doctor bar assembly is not in use it is forced into the position shown by phantom line 96 (FIG. 5). This is effected by an air cylinder 97 bolted to the support plate 72 which forces a drip pan 98 into a position beneath the resin tank opening 82, and this drip pan presses against the doctor bar assembly and lifts it away from the web 94 when the pan is pushed into the position shown by phantom line 99 in FIG. 5. The drip pan is used to catch resin draining off the doctor bar after it is retracted.

The path the fibrous material 62 follows from the rolls 61 to the mandrel 10 is shown in FIGS. 2-5. The rotating mandrel 10 pulls each layer of fibrous material 62 over horizontal cylindrical guide bars 104 attached to and projecting outwardly from the front face 162 of the middle horizontal beam 49 and through a spring loaded tensioner brake 106. There is one guide bar 104 for each layer of fibrous material 62. The brake 106 is attached to the underside of the top horizontal beam 50 directly above the guide bars 104. The brake 106 comprises a metal block 107 and two vertically oriented flat metal plates 108 which are pressed against the block 107 by adjustable springs 109. Each layer of fibrous material 62 is pulled through a gap between the block 107 and one of the plates 108 with the amount of tension on the lining material adjusted by varying the compression of the spring 109. It is important to maintain the lining material under tension to prevent wrinkles from being formed as the material is wound about the mandrel.

The layers of fibrous material 62 are vertically oriented as they are pulled through the tensioner brake 106. After passing through the tensioner brake, each layer makes a 90° turn over laterally spaced-apart, parallel, cylindrical turning bars 112, one for each layer of fibrous material, to become horizontally oriented. The turning bars 112 project from and are secured to the upper horizontal beam 50 directly above the brake 106. As shown in FIGS. 2 and 4, the fibrous material is now following a path which is generally parallel to the ground and the longitudinal axis of the mandrel 10.

The fibrous material preferably is wound on the mandrel in an helix. It is for this reason that the support plate 72 pivots. A different helix angle is used for each mandrel diameter so the angular orientation of the support plate 72 must be reset each time the mandrel size is changed. The plate 72 is maintained at the desired position relative to the mandrel 10 by any one of several presized links 114, the ends of which are secured with vertical pins 115, one of which is supported in a projection 164 attached to the free end 166 of the support plate 72, and the other of which is supported in a mounting block 165 on the back face 167 of the top horizontal beam 50.

As shown in FIGS. 4 and 5, one layer of fibrous material is oriented to the desired position relative to the mandrel by traveling over the cylindrical guide 90 and the other layer of fibrous material is oriented by traveling over the semicylindrical guide 91. Both layers are then pulled over the support bar 92. This is the first point at which the two layers come together to form the web 94. Resin 83 is then applied to the web in the region 116 of the web directly below the resin tank opening 82. The resin and web are then contacted by the doctor bar assembly 70, and the web is then wound about the mandrel 10.

After sufficient fibrous material is wound about the mandrel, the operator of the machine cuts the material with scissors or other cutting device. Although the lining carriage assembly shown in FIG. 2 has no means for cutting fibrous material, it is possible to provide the carriage with automatic cutting means.

Figure 6:
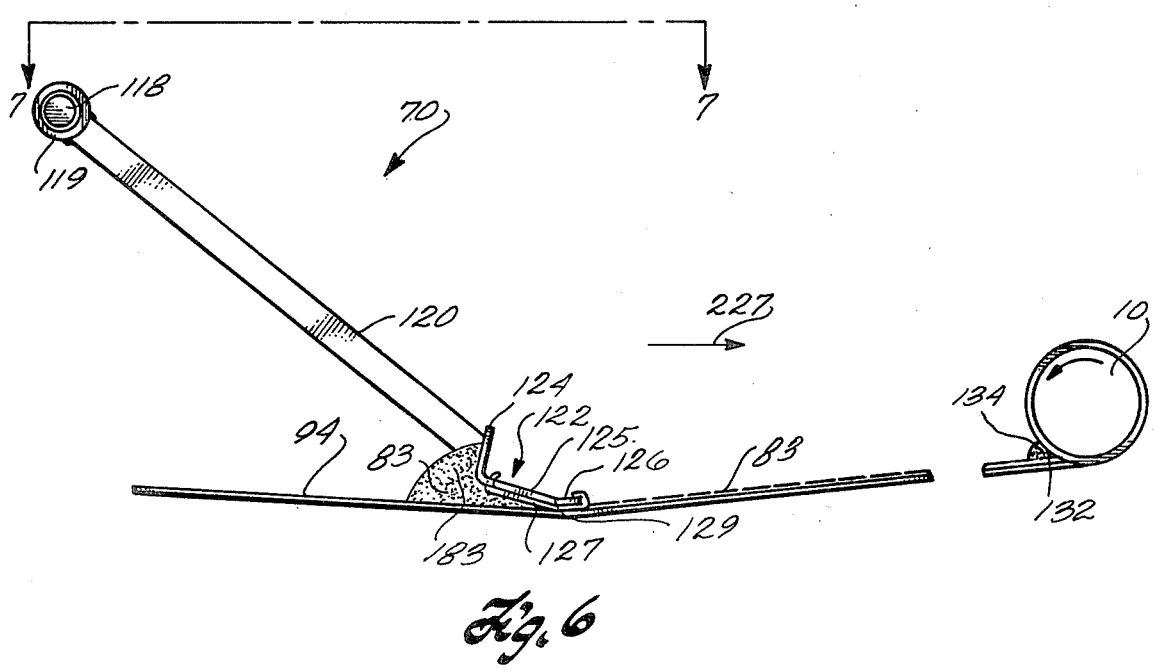
FIG. 6 is a detailed view of the doctor bar assembly shown in FIG. 5.

Referring to FIG. 6 and 7, the doctor bar assembly consists of a horizontal pivot pin 118 projecting from and secured to the support plate 72, a sleeve 119 mounted around the pin 118, two parallel laterally spaced-apart support bars 120, each of which is welded at one end to the sleeve 119 and supports the doctor bar or blade 122 at the opposite end.

The doctor bar 122 is formed from a single piece of sheet metal which is bent to provide three surfaces: a first surface 124 at the end distal from the mandrel, a second surface 125 in the middle, and a third surface 126 on the end towards the mandrel 10. Preferably at least the first 124 and second 125 surfaces of the doctor bar are wider than the width of the web and extend over the longitudinal edges of the web to ensure that the liner material is saturated with liquid throughout its entire width.

The first surface 124, which is transverse to the surface of the web, is welded to the support arms 120. This surface spreads resin across the width of the web. Preferably the first surface is substantially perpendicular to the surface of the web to uniformly spread the resin.

The second surface 125 converges with the web in the direction of travel of the web. This surface pressures a portion of the spread resin into the web, thereby leaving a residual layer of resin. The trailing edge 129 of the second surface serves to level or meter a residual resin layer not pressured into the web into a substantially uniform thickness on the surface of the web.

The third surface 6 is substantially parallel to the web 94 and extends from the first surface 124 in the direction of travel of the web, which is indicated by arrow 227 in FIGS. 6 and 7.

There are a plurality of parallel, narrow, uniformly spaced-apart wires 127 on the bottom of the second 125 and third 126 surfaces. These wires 127 extend in a direction parallel to the direction of travel of the web. Each wire 127 extends through one of a plurality of holes 128 in the second surface 125 and is bent around and located in one of a plurality of notches 130 in the edge 131 of the third surface 126 facing the mandrel.

These wires hold the trailing edge 129 of the second surface 125 away from the web so that a residual resin layer is spread into a substantially uniform thickness on the surface of the web.

This doctor bar 122 partially impregnates a web with liquid and leaves a residual layer of liquid on the web so that the web can be totally saturated with liquid at the pinch point 132 where the web is wrapped around the mandrel.

In operation a stream of resin 83 is delivered to the surface of the web 94 a little upstream of the doctor bar at point 116 as shown in FIG. 4 to collect in a pool 183 upstream of the first surface 124. The first surface 124 contacts the resin and serves to spread the resin across the width of the web. The wires 127 tend to prevent resin from being spread over the edges of the web by channeling the flow of resin once the resin passes under the first surface 124. Because of the second surface converges with the web in the direction of travel of the web, hydrodynamic pressure is created on the resin which pressurizes a portion of the spread resin into the web. The second surface converges with the web at an angle less than 45 degrees, and preferably less than 30 degrees, so that there is sufficient hydrodynamic pressure. The second surface does not have to converge with the web at a constant angle. For example, the top portion of the second surface can converge at an angle of about 45 degrees while the bottom portion closest to the web converges at an angle of say about 15 degrees. In this type of configuration the bottom portion of the second surface is substantially totally responsible for pressuring resin into the web.

Typically only a portion of the resin is pressurized into the web by the effect of the second surface and the web is not completely saturated. Residual resin is leveled or metered into a layer of substantially uniform thickness by the trailing edge 129 of second surface 125. Wires 127 in contact with the surface of the web 94 hold the second surface 125 a desired distance apart from the surface of the web 94, regardless of small changes in resin viscosity, web speed, and the like. This assures that the residual resin is metered into a layer of desired thickness, regardless of minor fluctuations in process parameters. The weight of the doctor bar is not critical in obtaining a residual layer of uniform thickness; all that is important is that the doctor bar weigh enough so that the wires are brought into gentle contact with the web.

Although FIGS. 5 and 6 show a doctor bar where the projections comprise a plurality of wires, the projections do not necessarily have to be wires. All that is required is that there are a plurality of smooth surfaced, slender, longitudinally aligned projections of substantially uniform height on the trailing edge of the second surface which do not abrade the fibrous material. The advantage of using wires is that they provide an economical means of achieving the required geometry. The wires should extend in the direction of travel of the web, as shown in FIGS. 6 and 7, so that they do not wipe the residual resin layer off the web.

After the web travels past the doctor bar 122, the layer of residual resin on the web tends to soak into the web as the web travels toward the rotating mandrel 10. This distance, which must usually be kept short to achieve accurate wrapping of the web and to minimize the time during which the resin can weaken the unsupported web, can easily be determined by experimentation. In situations where the soaking process proceeds slowly, soaking does not contribute substantially to the total impregnation process.

The proper delivery rate of resin also is determined by experimentation. Sufficient resin must be provided to impregnate the entire width of the web, but not so much resin that an excessive amount of resin flows over the edge of the web.

At the pinch point 132, where the web is wrapped around the mandrel, a pool of resin 134 is formed. The rotating mandrel 10 forces or presses this resin pool 134 into the web, thereby completely saturating the web with liquid. Any air which may have been in the web is finally driven out at this pinch point. This results in product of uniform quality since there are no voids due to air in the lining material after the resin is cured.

Depending upon the width of the web, it can be necessary to apply the resin to the web at more than one point. It has been found that with wide webs, when the pool of resin ahead of the doctor bar is deep enough to spread the entire width of the web, excessive impregnation in the central area of the web can occur. This problem is solved by introducing the resin at extra points along the width of the web.

The method and doctor blade described above are useful with many liquid/absorbent material systems. The web can be made of mineral fibers such as glass or asbestos; animal fibers such as wool; vegetable fibers such as cotton; synthetic fibers such as nylon, rayon, Dacron, Orlon, polyesters, polyolefins; and the like.

The liquid or resin used to impregnate the web can be any substance which is compatible with the material of which the web is fabricated. For example, in the manufacture of reinforced plastic pipe the liquid can be a thermosetting resin such as epoxy, polyester, and the like.

Many substantial advantages are realized when a web is impregnated with a liquid with the method and apparatus of this invention. Product of uniform quality is prepared because the web is completely saturated with liquid. Therefore there are few air pockets, if any, in the web, and thus few, if any, weak spots in the final product.

This method also serves to conserve raw materials because there is less tendency to break or damage the fibrous material which can occur when the fibrous material is presoaked or resin is pressed into the fibrous material with a hand held squeegee. Also, this method allows mechanical handling of delicate fibrous materials which up to now had to be applied by hand.

A very important advantage of the method of this invention is that production of reinforced plastic pipe at increased rates is realized because both the doctor bar and the mandrel press resin into a delicate fibrous material, rather than just the mandrel. Therefore, it is not necessary to wrap the liner around the mandrel at slow rates so that the pressure from the mandrel at the pinch point 132 completely saturates the lining material.

Another advantage of the method of this invention is that it improves consistency of quality because operator skill and attention are only minimally involved.

These and other advantages of the method and apparatus of this invention are shown by the following control and example.

CONTROL

In the manufacture of reinforced plastic pipe of 4" nominal diameter from epoxy resin, a web was formed consisting of two layers of 0.020-inch thick fibrous material comprising a jackstraw arrangement of Fiberglass chemical type C fibers coated with a silane adhesion promoter and held together with a small amount of resinous binder. This fibrous material was obtained from Owen-Corning Fiberglass Corp. of Toledo, Ohio under the designation M-514, Treatment 248. The apparatus described above and shown in FIGS. 1–5 without the doctor bar was used for applying the web. The web was maintained under a tension of 1.5 pounds per inch of web width to prevent the formation of wrinkles as the web was wrapped on the mandrel. Epoxy resin with viscosity of 600 centipoise was applied to the surface of the web at 10½ inches from the center line of the mandrel. The maximum speed that the web was wound around the mandrel without leaving air in the web was 50 feet per minute.

EXAMPLE

Reinforced plastic pipe of 4 inch diameter was prepared using the same materials and apparatus used for the control, except that the doctor bar described above and shown in FIGS. 6 and 7 was used. The wire used for the doctor bar was 19 gauge and was evenly spaced apart with four wires to the linear inch. The epoxy resin was placed on the web at 10½ inches from the center line of the mandrel and was contacted by the doctor bar 10 inches from the center line of the mandrel. The web was wound around the mandrel at a rate of 100 feet per minute with complete saturation of the fibrous material.

Although the method of this invention has been described in terms of a preferred embodiment and preferred apparatus for practicing the method, other embodiments of the invention are obvious to those skilled in the art. For example, with some resin/lining material systems, it may be advantageous to partially presoak the lining material with the resin before using the doctor bar where the lining material is very difficult to saturate.

The doctor bar itself can be modified. For example, the first and second surfaces can be separated so that the means for spreading resin and the means for pressurizing a portion of the resin into the lining material are separate structures. In this variation it is necessary to meter the spread resin into a uniformly thick layer so that the second surface pressures resin into the web uniformly across the width of the web.

Because of variations such as these in the preferred version of the invention, the spirit and scope of the appended claims should not necessarily be limited to the description of the preferred versions.

I claim:

1. A method for impregnating a moving fibrous web having a first surface and a second surface with a liquid resin comprising the steps of:

applying a liquid resin to only the first surface of the web;

spreading the liquid resin over the first surface of the web and pressuring a portion of the spread liquid resin into the web to only partially saturate the web with the liquid resin and leave residual liquid resin on the first surface of the web by contacting the spread liquid resin with a stationary surface converging with the web in the direction of travel of the web;

metering the residual liquid resin into a layer of substantially uniform thickness on the first surface by maintaining the surface converging with the web spaced apart from the first surface of the web;

winding the web around a rotating mandrel with the first surface disposed toward the mandrel; and maintaining a sufficient pool of liquid resin on the first surface of the web at a pinch point between the web and the mandrel for pressing the layer of metered residual liquid resin into the web to completely saturate the web with the liquid resin.

2. The apparatus of claim 1 in which the resin is a thermosetting resin.

3. A method for producing plastic pipe on a rotating pipe mandrel from at least one layer of a fibrous material saturated with liquid resin comprising the steps of:

(a) preparing a web comprising at least one layer of fibrous material;

(b) moving the web longitudinally under tension;

(c) placing the liquid resin on only one surface of the web;

(d) spreading the placed liquid resin across the width of the web;

(e) only partially saturating the web with the spread liquid resin by pressuring only a portion of the spread liquid resin into the web by contacting the spread liquid resin with a stationary surface converging with the web in the direction of travel of the web, thereby leaving a layer of residual liquid resin on the one surface of the web;

(f) leveling such residual liquid resin into a layer of substantially uniform thickness on the surface of the web by maintaining the surface converging with the web spaced apart from the surface of the web;

(g) pressing such leveled residual liquid resin into the web to completely saturate the web with liquid resin by winding the web around the rotating pipe mandrel; and (h) solidifying the resin on the pipe mandrel.

4. The method of claim 3 in which the liquid resin is a thermosetting resin.

5. A method for producing plastic pipe on a rotating pipe mandrel from at least one layer of fibrous liner material saturated with liquid resin comprising the steps of:

(a) preparing a web comprising at least one layer of liner material;

(b) moving the web longitudinally under tension;

(c) applying liquid resin onto only one surface of the moving web;

(d) contacting the applied liquid resin with a first stationary surface substantially perpendicular to the surface of the web for spreading the liquid resin across the width of the web;

(e) contacting the spread liquid resin with a second stationary surface converging with the web in the direction of travel of the web for pressuring a portion of the spread liquid resin into the web while leaving residual liquid resin on the one surface of the web;

(f) contacting the surface of the web with a plurality of smooth projections of substantially uniform height on the underside of the trailing edge of the second surface to hold the said trailing edge out of contact with the surface of the web and prepare a layer of the residual liquid resin of substantially uniform thickness on the web's surface, wherein the projections are smooth-surfaced and extend in the direction of travel of the web;

(g) pressing residual liquid resin into the web to completely saturate the web with liquid resin by winding the web onto the rotating pipe mandrel; and (h) solidying the resin on the pipe mandrel.

6. A method as claimed in claim 5 in which the liner material is a glass fiber surface mat.

7. An apparatus for impregnating a moving fibrous web with a liquid resin comprising:

means disposed above the top surface of the fibrous web for applying a liquid resin to only the top surface of the web;

means for spreading the liquid resin over the top surface of the web, including:

means forming a stationary surface converging with the web in the direction of travel of the web for pressuring a portion of the liquid resin into the web to only partially saturate the web and leave residual liquid resin on the web; and means for holding the trailing edge of the converging surface out of contact with the surface of the web for metering the residual liquid resin into a layer of substantially uniform thickness on the top surface, the liquid resin in the residual layer plus liquid resin partially saturating the web being at least sufficient for completely saturating the web; and means for pressing the layer of residual liquid resin through the web to completely saturate the web with the liquid.

8. An apparatus as claimed in claim 7 in which the means for spreading comprises a surface transverse to the surface of the web.

9. An apparatus as claimed in claim 8 in which the transverse surface is substantially perpendicular to the surface of the web.

10. An apparatus as claimed in claim 7 in which the surface of the web and the converging surface converge at an angle of less than about 30°.

11. An apparatus as claimed in claim 7 in which the means for holding the trailing edge of the pressuring surface out of contact with the web surface includes a plurality of smooth projections of substantially uniform height on the trailing edge and in contact with the web.

12. An apparatus for impregnating a moving fibrous web with a liquid resin comprising:
(a) a first stationary surface transverse to the web for spreading applied liquid over the top surface of the web;
(b) a second stationary surface converging with the top surface of the web in the direction of travel of the web for pressuring liquid resin into the web; and
(c) a plurality of projections of substantially uniform height positioned between the trailing edge of the second surface and the web for metering liquid resin over the top surface of the web, wherein said projections are attached to the second surface and extend toward the top surface of the web for contacting the top surface of the web and maintaining the trailing edge a selected distance from the web.

13. An apparatus as claimed in claim 12 in which the first surface is at least as wide as the web.

14. An apparatus as claimed in claim 13 in which the second surface is at least as wide as the web.

15. An apparatus as claimed in claim 12 in which the second surface is at least as wide as the web.

16. An apparatus as claimed in claim 12 in which the projections on the second surface are smooth surfaced.

17. An apparatus as claimed in claim 16 in which the projections are substantially parallel to the direction of motion of the web.

18. An apparatus as claimed in claim 12 in which the projections are substantially parallel to the direction of motion of the web.

19. An apparatus as claimed in claim 12 in which the projections are narrow, spaced apart, smooth-surfaced, and extend beyond the second surface parallel to the web.

20. An apparatus as claimed in claim 12 in which the first surface is substantially perpendicular to the surface of the web.

21. An apparatus for manufacturing reinforced plastic pipe comprising a doctor bar assembly for impregnating a moving fibrous lining material with a liquid resin applied to only one surface of the lining material, wherein the doctor bar comprises:
a first stationary surface substantially perpendicular to the one surface of the lining material for spreading liquid resin applied to the one surface of the lining material, wherein the first surface extends beyond both longitudinal edges of the lining material;
a second stationary surface at least as wide as the lining material converging with the one surface of the lining material in the direction of travel of the lining material for pressuring spread liquid resin into the one surface of the lining material, wherein the second surface extends beyond both longitudinal edges of lining material; and
a plurality of smooth-surfaced, laterally spaced-apart, elongated projections on the trailing edge of the second surface, wherein the projections extend toward the web and beyond the second surface in a direction substantially parallel to the direction of motion of the web for contacting the one surface of the lining material and maintaining the trailing edge a selected distance from the lining material.

22. An apparatus as claimed in claim 21 in which the projections comprise a plurality of parallel metal wires.

23. An apparatus as claimed in claim 21 in which the projections are uniformly spaced apart.

* * * * *